United States Patent
Moskal et al.

(10) Patent No.: US 9,493,627 B2
(45) Date of Patent: *Nov. 15, 2016

(54) MOLDABLE SAND COMPOSITIONS AND METHODS FOR MAKING THE SAME

(71) Applicant: Crayola LLC, Easton, PA (US)

(72) Inventors: Michael Moskal, Pottstown, PA (US); Jie Li, Allentown, PA (US); Leena Vadaketh, Doylestown, PA (US); Michael Spera, Mohnton, PA (US)

(73) Assignee: Crayola LLC, Easton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/693,258

(22) Filed: Apr. 22, 2015

(65) Prior Publication Data

US 2015/0225534 A1    Aug. 13, 2015

Related U.S. Application Data

(63) Continuation of application No. 13/790,692, filed on Mar. 9, 2013, now Pat. No. 9,039,481.

(51) Int. Cl.
| | |
|---|---|
| *A63H 33/32* | (2006.01) |
| *C08K 3/36* | (2006.01) |
| *A63H 33/00* | (2006.01) |
| *C08L 29/04* | (2006.01) |
| *B44C 3/04* | (2006.01) |
| *C04B 26/04* | (2006.01) |
| *C08K 5/053* | (2006.01) |

(52) U.S. Cl.
CPC ............ *C08K 3/36* (2013.01); *A63H 33/001* (2013.01); *A63H 33/32* (2013.01); *B44C 3/04* (2013.01); *C04B 26/04* (2013.01); *C08K 5/053* (2013.01); *C08L 29/04* (2013.01)

(58) Field of Classification Search
USPC ......... 446/70; 434/81, 82; 106/38.2, 205.01, 106/205.03, 402, 726, 737, 783, 788
See application file for complete search history.

(56) References Cited

U.S. PATENT DOCUMENTS

| | | | |
|---|---|---|---|
| 3,632,786 A | 1/1972 | Nickerson | |
| 4,925,493 A | 5/1990 | Lamoreaux | |
| 4,957,558 A | 9/1990 | Ueda | |
| 5,108,336 A | 4/1992 | Rosier | |
| 5,460,561 A | 10/1995 | Dahlgren | |
| 5,473,009 A | 12/1995 | Kimura | |
| 5,506,290 A * | 4/1996 | Shapero ............ | B44C 3/04 524/276 |
| 5,587,008 A | 12/1996 | LaFay | |
| 5,711,795 A | 1/1998 | Browning | |
| 5,718,750 A | 2/1998 | Weggel | |
| 5,873,570 A | 2/1999 | Jones | |
| 5,873,933 A | 2/1999 | Mackey | |
| 5,916,949 A | 6/1999 | Shapero | |
| 5,961,389 A | 10/1999 | Dickinson | |
| 6,017,387 A | 1/2000 | Hadano | |
| 6,290,616 B1 | 9/2001 | Evans | |
| 6,455,618 B2 | 9/2002 | Schledjewski | |
| 6,881,781 B1 | 4/2005 | Gamba | |
| 6,899,755 B2 | 5/2005 | Perlman | |
| 6,960,143 B2 | 11/2005 | Sato | |
| 7,273,573 B2 | 9/2007 | Racunas, Jr. | |
| 7,582,354 B2 | 9/2009 | Modell | |
| 7,862,894 B2 | 1/2011 | Modell | |
| 8,603,236 B2 * | 12/2013 | Cordova ............ | C08K 3/26 106/205.2 |
| 2003/0131758 A1 | 7/2003 | Breindl | |
| 2003/0228939 A1 | 12/2003 | Sato | |
| 2008/0035020 A1 | 2/2008 | Schnorrer | |
| 2010/0248581 A1 | 9/2010 | Adams | |
| 2011/0215500 A1 | 9/2011 | Farrell | |

FOREIGN PATENT DOCUMENTS

| | | |
|---|---|---|
| DE | 4324840 | 1/1995 |
| EP | 0914882 | 5/1999 |
| EP | 1866044 | 9/2006 |
| EP | 1887035 | 2/2008 |
| EP | 2054128 | 2/2008 |
| JP | 55147459 | 11/1980 |
| JP | 61078533 | 4/1986 |
| JP | 2000190049 | 7/2000 |
| JP | 2003310810 | 11/2003 |
| RU | 2378215 | 12/2007 |
| WO | 9903936 | 1/1999 |
| WO | 9909093 | 2/1999 |
| WO | 0159004 | 8/2001 |
| WO | 2006101440 | 9/2006 |
| WO | 2008020800 | 2/2008 |
| WO | 2009022867 | 2/2009 |

OTHER PUBLICATIONS

Entire patent prosecution history of U.S. Appl. No. 13/790,692, filed Mar. 8, 2013, entitled, "Moldable Sand Compositions and Methods for Making the Same," now U.S. Pat. No. 9,039,481, issued May 26, 2015.

International Search Report and Written Opinion issued for PCT/US2013/035766 dated Jul. 25, 2013.

New Zealand Examination Report dated Jan. 6, 2016 for New Zealand Application No. 629471.

\* cited by examiner

*Primary Examiner* — Kurt Fernstrom

(74) *Attorney, Agent, or Firm* — RatnerPrestia

(57) ABSTRACT

The present invention relates to moldable sand compositions, methods for making the moldable sand compositions, and methods for using the moldable sand compositions. In a particular embodiment, the moldable sand composition comprises between about 70% to about 95% sand, between about 5% to about 30% water, a polar polymeric resin, a crosslinking agent, and a humectant. In an exemplary embodiment, the composition contains no oils, waxes, glycols, or rubbers. The composition is capable of becoming hardened over time in order to maintain the achieved shape, and can be re-wetted and molded again after becoming hardened.

20 Claims, No Drawings

MOLDABLE SAND COMPOSITIONS AND METHODS FOR MAKING THE SAME

CROSS-REFERENCE TO RELATED APPLICATIONS

This application is a continuation of U.S. application Ser. No. 13/790,692, filed Mar. 8, 2013, which claims the benefit of priority of U.S. Provisional Application No. 61/622,145, filed Apr. 10, 2012, the contents of which applications are incorporated by reference herein, in their entireties and for all purposes.

FIELD OF THE INVENTION

The present invention relates generally to moldable compositions for use as a children's craft product, and more particularly to moldable sand compositions that can dry and harden, and are reusable after re-wetting.

BACKGROUND OF THE INVENTION

Many different types of modeling compositions for creating figures or sculptures have been introduced over time, particularly for use as craft products by children, and for general artistic purposes. One of the most conventional types of modeling composition is oil-based clay, which remains malleable even when left for long periods in dry environments. Other modeling compositions, such as water-based starch doughs, can typically dry and harden when left out in the open air. However, starch-based modeling compositions have a tendency to break apart during the molding process, and to crack after they have dried.

Moldable compositions based on sand have a grainier texture compared to those based on clay or starch. One of the disadvantages of some sand-based compositions is that they contain components such as oil, wax, or rubber, which can produce a greasy or sticky feeling, in addition to the risk of staining clothes or the surrounding environment. Sand-based compositions also do not typically harden, and if they do harden, they cannot be re-wetted and molded again. There remains a need for moldable craft materials that provide the experience of playing with sand, that are suitable to be handled by children, that provide the versatility of being able to harden and maintain the achieved shape, and that can be molded again after re-wetting.

SUMMARY OF THE INVENTION

An embodiment of the present invention provides a moldable sand composition comprising between about 70% to about 95% sand, between about 5% to about 30% water, a polar polymeric resin, a crosslinking agent, and a humectant. In an exemplary embodiment, the composition contains no oils, waxes, glycols, or rubbers.

Another embodiment of the present invention provides a method for making a moldable sand composition comprising mixing between about 70% to about 95% sand, between about 5% to about 30% water, a polar polymeric resin, a crosslinking agent, a humectant, and one or more additives. In particular embodiments, the composition is capable of becoming hardened at room temperature over time in order to maintain the achieved shape, and can be re-wetted and molded again after becoming hardened.

Another embodiment of the present invention provides a method of using a moldable sand composition comprising molding the moldable composition into a desired shape; exposing the composition to air for a period of time sufficient for it to become a hardened composition; adding water to the hardened composition to make a re-wetted moldable composition; and molding the re-wetted moldable composition, wherein the moldable composition comprises between about 70% to about 95% sand, between about 5% to about 30% water, a polar polymeric resin, a crosslinking agent, and a humectant.

DETAILED DESCRIPTION OF THE INVENTION

The present invention provides moldable sand compositions for use by children and artists, particularly for use as a children's craft product. The compositions have a grainy texture and provide the user with the sensation of playing with wet sand, but without the mess normally associated with sand (i.e., very little residual sand comes off of the moldable composition onto the user's hands or the surrounding environment). The compositions of the present invention are moldable, which means a user can manipulate the compositions into desired shapes and figures. The compositions have a hardening characteristic, which means that they are initially moldable but are capable of drying and hardening if left in open air at room temperature for a period of time (i.e., left outside of any enclosure, such as a container, that would substantially prevent moisture from evaporating off of the composition), so that they maintain the achieved shape. The compositions are no longer moldable if they harden, but become moldable again after the addition of water. The compositions are water-based and are preferably free of oily components, which means they do not leave an oily residue on the user's hands or on the surrounding environment. The compositions are also non-staining and are suitable for use by children. The moldable sand compositions of the present invention have a unique sandy texture and they are visco-elastic (i.e., they can stretch and flow), unlike other moldable sand compounds.

According to preferred embodiments, the moldable sand composition of the present invention comprises sand, water, a polar polymeric resin, a crosslinking agent, and optionally a humectant and additives. The moldable sand composition preferably comprises between about 70% to about 95% sand and between about 5% to about 30% water. As used herein, a percentage (%) refers to a weight percentage of the composition (with the "composition" referring to all of the components in the total composition, including any components that are premixed prior to being combined with the rest of the components), unless indicated otherwise. Any type of sand may be used in the compositions of the present invention. In preferred embodiments, the most common component of the sand (and most preferably the only component) is silica sand. As used herein, "sand" refers to either colored or non-colored sand, and may include mixtures of different types of sand. The sand particles can be any shape, but in preferred embodiments most of the sand particles are spherical. Both the density and size of sand particles contribute to the unique properties of the present invention. Sand particles are large enough to yield a rough, sandy texture to dried objects.

According to particular embodiments, the sand that is used in the composition is pre-colored sand, which means that the sand particles are pre-coated with a pigment dispersion to impart color, prior to the sand being included in the composition. In alternative embodiments, the sand is not pre-colored (i.e., it is unpigmented), so that it has a neutral color, such as white or tan. In those embodiments, a pigment can be added to the moldable sand composition as an additive, preferably in the form of a pigment dry blend. For example, the pigment can be added to the composition in an amount between about 0.01% to about 10%, between about 0.01% to about 7.5%, between about 0.01% to about 5%, between about 0.01% to about 3%, between about 0.01% to about 2%, or between about 0.01% to about 1%. According to particular embodiments, the color of the composition becomes more intense (brighter) as the amount of pigment that is added to the composition increases. In these embodiments, it has been observed that the sand particles themselves do not change color; rather, the color imparted by the pigment tends to remain mixed with the other components of the composition. According to certain embodiments, "special effect" pigments can be used, such as fluorescent pigments, which can impart a neon effect to the composition, or phosphorescent pigments, which can impart a "glow in the dark" effect.

The sand particles of the present invention are preferably greater than 150 µm in diameter, more preferably between about 150 µm to about 400 µm in diameter, and most preferably between about 200 µm to about 300 µm in diameter. Compositions of the present invention preferably comprise between about 70% to about 95% sand, more preferably between about 80% to about 90% sand, and most preferably between about 84% to about 88% sand. In an exemplary embodiment, a composition of the present invention comprises about 86% sand.

The compositions of the present invention comprise a sufficient amount of water to act as a solvent for the other components, but not so much water that the compositions shrink substantially after the water evaporates. The compositions preferably maintain a high dry strength upon hardening. In an exemplary embodiment, water is the only solvent in the composition (i.e., the composition does not contain any other solvents, including water-miscible solvents such as glycols). This provides the beneficial characteristic that, once the composition becomes dry and hardened at room temperature, only water needs to be added to the dried composition so that it becomes moldable again. This also provides an advantage over moldable compositions that cannot be re-wetted and re-molded after they have hardened. In preferred embodiments, compositions of the present invention comprise between about 5% to about 30% water, more preferably between about 7% to about 20% water, and most preferably between about 8% to about 12% water. In an exemplary embodiment, a composition of the present invention comprises about 9.5% water. The amount of water in the composition may decrease over time as the composition is left in open air and the water evaporates.

According to certain aspects of the invention, the sand and water together comprise greater than 90% of the total composition, more preferably greater than 92% of the total composition, and most preferably greater than 95% of the total composition. In certain embodiments of the invention, the ratio of sand to water is between about 3 to about 15, more preferably about between about 4 to about 12, and most preferably about between about 7 to about 10. In an exemplary embodiment, a composition of the present invention comprises a ratio of sand to water of about 9. The relative amounts of sand and water help the composition remain moldable while providing a high dry strength when the composition hardens at room temperature.

The compositions of the present invention include a polar polymeric resin as a binder. According to preferred embodiments, the polar polymeric resin is poly(vinyl alcohol) (PVA). However, other polar polymeric resins known by those skilled in the art may also be used. In certain embodiments, compositions of the present invention comprise between about 0.5% to about 3% polar polymeric resin, more preferably between about 0.75% to about 2.75% polar polymeric resin, and most preferably between about 1% to about 2% polar polymeric resin.

PVA is made by the hydrolysis of poly(vinyl acetate) and, when commercially purchased, may be partially or fully hydrolyzed. PVA varies in molecular weight according to the length of the resin chain. In a preferred embodiment, the composition includes PVA which is partially hydrolyzed (about 87-89%). A particularly preferred type of PVA is Celvol® 523. In certain embodiments, compositions of the present invention comprise between about 0.5% to about 3% PVA, more preferably between about 0.75% to about 2.75% PVA, and most preferably between about 1% to about 2% PVA.

The compositions of the present invention include one or more crosslinking agents. The one or more crosslinking agents preferably comprise a boric compound, such as boric acid or a borate salt. Boric acid is the most preferred crosslinking agent. According to alternative embodiments, the one or more crosslinking agents may not comprise a boric compound. Non-limiting examples of such crosslinking agents include titanates and zirconates (e.g., those commercially available under the Tyzor® tradename), dialdehydes such as glutaraldehyde, polyfunctional acids such as adipic and citric acids, polyfunctional acid anhydrides such as trimellitic anhydride, non-monovalent cations such as $Ca^{2+}$, $Fe^{3+}$, etc. In certain embodiments, compositions of the present invention comprise between about 0.1% to about 0.5% crosslinking agent(s), more preferably between about 0.15% to about 0.45% crosslinking agent(s), and most preferably between about 0.2% to about 0.4% crosslinking agent(s).

In preferred embodiments, compositions of the present invention comprise one or more humectants. Humectants inhibit drying and increase the amount of time that the composition remains moldable prior to drying and becoming hardened. A wide variety of humectant materials may be employed. In a preferred embodiment, the composition comprises glycerin as a humectant. The composition preferably comprises between about 1% to about 3% humectant, more preferably between about 1.25% to about 2.75% humectant, and most preferably between about 1.5% to about 2.5% humectant.

According to certain embodiments, compositions of the present invention comprise one or more additional additives. These additives may include, but are not limited to, pH adjusters, buffers, defoamers, dispersing agents, scents, preservatives, and/or colorants. The compositions preferably comprise less than about 1% additives, more preferably less than about 0.9% additives, most preferably less than about 0.8% additives. In preferred embodiments, the compositions of the present invention comprise between about 0.1% to about 2% additives, more preferably between about 0.25% to about 1.5% additives, and most preferably between about 0.5% to about 1% additives. Alternatively, the one or more additives may be present in larger amounts if the additive(s) include one or more pigments for imparting color to compositions that include sand which is not pre-colored (as discussed above); for example, the additive(s) may be present in the composition in an amount between about 0.01% to about 10%, between about 0.01% to about 7.5%, between about 0.01% to about 5%, between about 0.01% to about 3%, between about 0.01% to about 2%, or between about 0.01% to about 1%.

Such additives are readily available from numerous sources. Common pH adjusters include phosphoric acid and triethanolamine. Defoamers, such as Foamex® 825, can be added to eliminate air bubbles upon mixing of the components. One or more preservatives, such as anti-microbial agents and fungicides, can be added to increase the shelf life of the composition. Some examples of preservatives include Kathon® LX, Nuosept® 95, Acticide® LA, and Polyphase® P100. One or more colorants, such as pigments (e.g., as discussed above with respect to pigments that may be used with sand that is not pre-colored) or dyes, may optionally be used in the composition. A scent or fragrance may also be added to the composition.

According to certain aspects of the present invention, the moldable sand composition comprises sand, water, a polar polymeric resin, a crosslinking agent, a humectant, and one or more additives (e.g., one or more pH adjusters, buffers, defoamers, dispersing agents, scents, preservatives, colorants, or a combination thereof). According to particular embodiments, the moldable sand composition comprises between about 70% to about 95% sand, between about 5% to about 30% water, between about 0.5% to about 3% polar polymeric resin (e.g., PVA), between about 0.1% to about 0.5% crosslinking agent, between about 1% to about 3% humectant, and between about 0.01% to about 10% additives (e.g., between about 0.01% to about 7.5% additives, between about 0.01% to about 5% additives, between about 0.01% to about 3% additives, between about 0.01% to about 2% additives, or between about 0.01% to about 1% additives). According to preferred embodiments, the moldable sand composition comprises between about 70% to about 95% sand, between about 5% to about 30% water, between about 0.5% to about 3% polar polymeric resin (e.g., PVA), between about 0.1% to about 0.5% crosslinking agent, between about 1% to about 3% humectant, and between about 0.1% to about 2% additives. According to more preferred embodiments, the moldable sand composition comprises between about 80% to about 90% sand, between about 7% to about 20% water, between about 0.75% to about 2.75% polar polymeric resin (e.g., PVA), between about 0.15% to about 0.45% crosslinking agent, between about 1.25% to about 2.75% humectant, and between about 0.25% to about 1.5% additives. According to most preferred embodiments, the moldable sand composition comprises between about 84% to about 88% sand, between about 8% to about 12% water, between about 1% to about 2% polar polymeric resin (e.g., PVA), between about 0.2% to about 0.4% crosslinking agent, between about 1.5% to about 2.5% humectant, and between about 0.5% to about 1% additives. According to an exemplary embodiment, the moldable sand composition comprises about 86% sand, about 9.5% water, about 1.5% polar polymeric resin (e.g., PVA), about 0.3% crosslinking agent, about 2% glycerin, and about 0.7% additives.

Advantageously, there are numerous ingredients in other commercially available moldable compositions which are not included in compositions of the present invention. In a preferred embodiment, the composition does not include any cellulose compounds, such as hydroxypropyl cellulose, which could promote undesirable microbial growth. The composition also preferably does not include any glycols, such as propylene glycol. A glycol compound would be likely to impede drying and would therefore interfere with the ability of the composition to become hardened. In embodiments where the compositions are solely water-based and do not include solvents such as glycols, the compositions can more easily harden due to water evaporation and can become moldable again after the addition of water.

In additional preferred embodiments, the composition does not include any oils or oily components, such as mineral oil, petroleum, paraffin oil, or silicone oil. It is also preferred that the composition does not include any rubbers, such as polyisobutylene, or waxes, such as silicon wax. These components commonly produce a greasy or sticky feeling, in addition to the risk of staining clothes or the surrounding environment. They may also interfere with the ability of the composition to become hardened, and to then become moldable again after the addition of water.

Because the composition preferably has a grainy texture, rather than a smooth texture that is characteristic of other moldable compositions, it is not necessary to coat the sand particles with an additional component that imparts a smooth texture rather than a grainy texture. Thus, the composition is preferably free of calcium carbonate, talc, alumina trihydrate, and titanium dioxide, which are commonly added to other commercially available products.

According to certain aspects of the present invention, the moldable sand composition consists of, or consists essentially of, sand, water, a polar polymeric resin, a crosslinking agent, a humectant, and one or more additives (e.g., one or more pH adjusters, buffers, defoamers, dispersing agents, scents, preservatives, colorants, or a combination thereof). Thus, according to certain aspects, the moldable sand composition is absent (i.e., contains 0%) cellulose compounds, glycols, oils, rubbers, and waxes. According to particular embodiments, the moldable sand composition consists of, or consists essentially of, between about 70% to about 95% sand, between about 5% to about 30% water, between about 0.5% to about 3% polar polymeric resin (e.g., PVA), between about 0.1% to about 0.5% crosslinking agent, between about 1% to about 3% humectant, and between about 0.01% to about 10% additives (e.g., between about 0.01% to about 7.5% additives, between about 0.01% to about 5% additives, between about 0.01% to about 3% additives, between about 0.01% to about 2% additives, or between about 0.01% to about 1% additives). According to certain embodiments, the moldable sand composition consists of, or consists essentially of, between about 70% to about 95% sand, between about 5% to about 30% water, between about 0.5% to about 3% polar polymeric resin (e.g., PVA), between about 0.1% to about 0.5% crosslinking agent, between about 1% to about 3% humectant, and between about 0.1% to about 2% additives. According to more preferred embodiments, the moldable sand composition consists of, or consists essentially of, between about 80% to about 90% sand, between about 7% to about 20% water, between about 0.75% to about 2.75% polar polymeric resin (e.g., PVA), between about 0.15% to about 0.45% crosslinking agent, between about 1.25% to about 2.75% humectant, and between about 0.25% to about 1.5% additives. According to most preferred embodiments, the moldable sand composition consists of, or consists essentially of, between about 84% to about 88% sand, between about 8% to about 12% water, between about 1% to about 2% polar polymeric resin (e.g., PVA), between about 0.2% to about 0.4% crosslinking agent, between about 1.5% to about 2.5% humectant, and between about 0.5% to about 1% additives. According to an exemplary embodiment, the moldable sand composition consists of, or consists essentially of, about 86% sand, about 9.5% water, about 1.5% polar polymeric resin (e.g., PVA), about 0.3% crosslinking agent, about 2% glycerin, and about 0.7% additives.

A method according to the present invention comprises combining all of the components of the compositions described above and thoroughly mixing them until they display a substantially uniform color, consistency, and texture. According to certain aspects of the present invention, a method for making a moldable sand composition comprises mixing the components of the compositions described above, namely, sand, water, a polar polymeric resin, a crosslinking agent, a humectant, and one or more additives (e.g., one or more pH adjusters, buffers, defoamers, dispersing agents, scents, preservatives, colorants, or a combination thereof) in the weight percentages described above, preferably at room temperature (i.e., the method is preferably free of any heating steps).

According to a preferred embodiment, the components of a "polar polymeric resin premix" (e.g., a "PVA premix") are separately combined and mixed together, with the premix comprising water, a humectant (e.g., glycerin), a polar polymeric resin (e.g., PVA), and one or more optional additives. The premix is combined with the other components of the composition, namely, sand, water, a crosslinking agent, and one or more optional additives. All of the components are then mixed together until a substantially uniform color, consistency, and texture are achieved. It is not necessary to heat any of the components during the process. Thus, all of the combining and mixing steps can be performed at room temperature (about 20° C.-about 25° C.).

The polar polymeric resin premix preferably comprises between about 5% to about 15% of the total composition, more preferably between about 7.5% to about 12%, and most preferably between about 9% to about 11%. In certain embodiments, the premix comprises between about 50% to about 75% water, more preferably between about 55% to about 70% water, and most preferably between about 60% to about 65% water. In certain embodiments, the premix further comprises between about 10% to about 30% humectant, more preferably between about 15% to about 25% humectant, and most preferably about 20% humectant. In certain embodiments, the premix further comprises between about 0.1% to about 10% additives, more preferably between about 2% to about 8% additives, and most preferably between about 3% to about 5% additives.

A method for using a moldable sand composition of the present invention comprises molding the moldable sand composition into a desired shape, exposing the moldable sand composition to air (preferably ambient air at room temperature, about 20° C.-about 25° C.) for a period of time sufficient for the moldable sand composition to become a hardened composition (i.e., exposing the composition to air comprises leaving the moldable sand composition outside of any enclosure, such as a container, that would substantially prevent moisture from evaporating off of the composition), adding water to the hardened composition to make a re-wetted moldable composition, and molding the re-wetted moldable composition, wherein the moldable sand composition comprises any of the moldable sand compositions described herein.

According to alternative embodiments, additional modifications may be made to the composition after it has been molded into a desired shape. For example, the method may further comprise adding a decorative agent to the composition, either before or after it has hardened. The decorative agent may be selected from the group consisting of glaze, paint, glitter, shimmer, and a combination thereof. After the composition has hardened, the method may further comprise chiseling the hardened composition (e.g., to add texture) or further sculpting the hardened composition.

The present invention also provides kits comprising a moldable sand composition. According to a particular embodiment, a kit comprises a moldable sand composition in accordance with embodiments of the present invention, and one or more molds. The composition is preferably provided in one or more containers, such as one or more tubs. Multiple portions of the composition can be removed from the container(s) and molded into a multitude of desired shapes. For example, after a portion of the moldable sand composition is packed into a mold, and then removed from the mold, the composition preferably retains the shape of the mold. The mold(s) provided in the kit may be any shape, for example, they may be in the shape of a star, square, circle, sphere, rectangle, or action figure. The kit may provide molds according to a particular theme, for example, a construction kit may comprise mold(s) in the shape of one or more bricks or concrete blocks. According to one embodiment, after a user has molded multiple portions of the composition into the shapes of multiple objects (e.g., bricks), the molded objects can be stacked next to each other and/or on top of each other to create a structure. The kit may further comprise one or more tools or toys (e.g., one or more toy cars or trucks) which can be used to mold or shape the composition, e.g., to reshape the composition after it has been molded into the shape of the one or more molds. For example, the kit may comprise one or more rollers for flattening a molded composition (e.g., for flattening portions of the molded composition that have been shaped into bricks). The roller(s) may be provided as part of a toy, such as a truck (e.g., a construction truck). The kit may also comprise one or more decorative agents (e.g., glaze, paint, glitter, and/or shimmer).

The following examples are provided to describe the invention in greater detail and are intended to illustrate, not limit, the invention.

EXAMPLES

Example 1

While only certain compositions are set forth below, alternative compositions will be apparent to those skilled in the art. Such artisans will be able to modify the compositions with an eye toward the desired performance properties and intended use.

The moldable sand compositions disclosed below were made by first mixing the components of the PVA Premix provided in Table 1 at room temperature (about 21° C.).

TABLE 1

| PVA Premix | |
|---|---|
| Component | Weight Percentage |
| Water | 61.64 |
| Glycerin | 20.03 |
| Celvol ® 523 PVA | 14.02 |
| Foamex ® 825 | 1.00 |
| Phosphoric Acid | 0.90 |
| Nuosept ® 95 | 1.81 |
| Kathon ® LX | 0.60 |
| Total | 100.0 |

The PVA Premix was then combined at room temperature with the other components of the composition, as set forth in Table 2 below.

TABLE 2

| Component | Weight Percentage |
| --- | --- |
| Sand | 86.2 |
| PVA Premix | 9.7 |
| City Water | 3.5 |
| Boric Acid | 0.3 |
| Triethanolamine | 0.3 |
| Total | 100.0 |

All of the components were mixed until a uniform color, consistency, and texture were achieved. The final composition is provided in Table 3 below.

TABLE 3

| Component | Weight Percentage |
| --- | --- |
| Sand | 86.20 |
| Water | 9.48 |
| Glycerin | 1.94 |
| Celvol ® 523 | 1.36 |
| Foamex ® 825 | 0.10 |
| Phosphoric Acid | 0.09 |
| Nuosept ® 95 | 0.18 |
| Kathon ® LX | 0.06 |
| Boric Acid | 0.30 |
| Triethanolamine | 0.30 |
| Total | 100.0 |

Example 2

Table 4 provides data with respect to the % weight loss and hardening characteristics over time for a 20 gram composition of the present invention under ambient conditions (70° F., 21° C., 45% relative humidity) that had been molded into a round shape. As shown in Table 4, the composition began to harden after approximately two hours. After approximately 24 hours, the composition exhibited approximately 11% weight loss and was hardened to the extent that it was no longer moldable or deformable by hand.

TABLE 4

| DryTime | % Weight Loss | Comments |
| --- | --- | --- |
| 0.5 Hours | 1 | Moist Surface |
| 1.5 Hours | 2 | Dry Surface |
| 2 Hours | 3 | Dry Surface - beginning to harden |
| 4 Hours | 4 | Continuing to harden |
| 5 Hours | 5 | Continuing to harden |
| 7 Hours | 6 | Continuing to harden - still deforms with pressure |
| 24 Hours | 11 | Hardened - does not deform |

Although the present invention has been described in connection with specific embodiments, it should be understood that the invention as claimed should not be unduly limited to such specific embodiments. Indeed, various modifications and variations of the described compositions and methods of the invention will be apparent to those of ordinary skill in the art and are intended to be within the scope of the appended claims.

What is claimed is:

1. A moldable sand composition comprising sand, water, a polar polymeric resin, one or more crosslinking agents, and a humectant, wherein a ratio of sand to water is between 7 and 15, and wherein the moldable sand composition is initially moldable, becomes hardened following exposure to air at room temperature, and becomes moldable again following an addition of water.

2. The composition of claim 1, wherein the sand comprises silica sand.

3. The composition of claim 1, wherein the one or more crosslinking agents comprise a boric compound.

4. The composition of claim 1, wherein the one or more crosslinking agents are selected from the group consisting of titanates, zirconates, dialdehydes, polyfunctional acids, polyfunctional acid anhydrides, non-monovalent cations and a combination thereof.

5. The composition of claim 1, wherein the humectant comprises glycerin.

6. The composition of claim 1, wherein the polar polymeric resin comprises PVA.

7. The composition of claim 1 comprising between about 80% to about 90% sand.

8. The composition of claim 1 comprising between about 7% to about 20% water.

9. The composition of claim 1 comprising between about 0.5% to about 3% polar polymeric resin.

10. The composition of claim 1 comprising between about 1% to about 3% humectant.

11. The composition of claim 1 further comprising one or more additives, wherein the additives are selected from the group consisting of pH adjusters, buffers, defoamers, dispersing agents, scents, preservatives, colorants, and combinations thereof.

12. The composition of claim 11, wherein the composition comprises less than about 1% of the one or more additives.

13. The moldable sand composition of claim 11 comprising between about 84% to about 88% sand, between about 8% to about 12% water, between about 1% to about 2% polar polymeric resin, between about 0.2% to about 0.4% one or more crosslinking agents, between about 1.5% to about 2.5% humectant, and between about 0.5% to about 1% additives.

14. The composition of claim 1, wherein the composition contains no oils, waxes, glycols, or rubbers.

15. A method for making a moldable sand composition comprising mixing sand, water, a polar polymeric resin, one or more crosslinking agents, a humectant, and one or more additives, wherein a ratio of sand to water is between 7 and 15, and wherein the moldable sand composition is initially moldable, becomes hardened following exposure to air at room temperature, and becomes moldable again following an addition of water.

16. The method of claim 15, wherein the composition comprises between about 84% to about 88% sand, between about 8% to about 12% water, between about 1% to about 2% polar polymeric resin, between about 0.2% to about 0.4% one or more crosslinking agents, between about 1.5% to about 2.5% humectant, and between about 0.5% to about 1% additives.

17. The method of claim 15, wherein the composition contains no oils, waxes, glycols, or rubbers.

18. The method of claim 15, wherein there is no heating step.

19. A kit comprising:
a moldable sand composition inside a container; and
one or more molds,
wherein the moldable sand composition comprises sand, water, a polar polymeric resin, one or more crosslinking agents, and a humectant, and wherein a ratio of sand to water is between 7 and 15, and wherein the moldable sand composition is initially moldable, becomes hardened following exposure to air at room temperature, and becomes moldable again following an addition of water.

20. The kit of claim 19 further comprising one or more toys for molding or shaping the composition.

* * * * *